(12) United States Patent
Kishida

(10) Patent No.: US 12,345,937 B2
(45) Date of Patent: Jul. 1, 2025

(54) ARMORED DSS CABLE

(71) Applicant: NEUBREX CO., LTD., Kobe (JP)

(72) Inventor: Kinzo Kishida, Kobe (JP)

(73) Assignee: NEUBREX CO., LTD., Kobe (JP)

( * ) Notice: Subject to any disclaimer, the term of this patent is extended or adjusted under 35 U.S.C. 154(b) by 232 days.

(21) Appl. No.: 18/250,241

(22) PCT Filed: Dec. 21, 2020

(86) PCT No.: PCT/JP2020/047596
§ 371 (c)(1),
(2) Date: Apr. 24, 2023

(87) PCT Pub. No.: WO2022/137273
PCT Pub. Date: Jun. 30, 2022

(65) Prior Publication Data
US 2023/0408781 A1   Dec. 21, 2023

(51) Int. Cl.
*G02B 6/44* (2006.01)
*G01B 11/16* (2006.01)

(52) U.S. Cl.
CPC ............ *G02B 6/4429* (2013.01); *G01B 11/16* (2013.01); *G02B 6/4416* (2013.01)

(58) Field of Classification Search
CPC .............................. G02B 6/4416; G02B 6/4429
See application file for complete search history.

(56) References Cited

U.S. PATENT DOCUMENTS

| | | | | |
|---|---|---|---|---|
| 4,525,702 A | * | 6/1985 | Kitagawa | ............. G02B 6/4469 385/112 |
| 5,182,779 A | * | 1/1993 | D'Agostino | ....... G01D 5/35316 385/13 |
| 2014/0029904 A1 | * | 1/2014 | Herbst | .................... E21B 47/00 385/102 |

(Continued)

FOREIGN PATENT DOCUMENTS

| | | | | |
|---|---|---|---|---|
| EP | 1439262 A2 | * | 7/2004 | ............... B66B 7/06 |
| JP | H0368825 A | | 3/1991 | |

(Continued)

OTHER PUBLICATIONS

International Search Report (PCT/ISA/210) with translation and Written Opinion (PCT/ISA/237) mailed on Mar. 9, 2021, by the Japan Patent Office as the International Searching Authority for International Application No. PCT/JP2020/047596. 8 pages.

(Continued)

*Primary Examiner* — Charlie Y Peng
(74) *Attorney, Agent, or Firm* — BUCHANAN, INGERSOLL & ROONEY PC

(57) ABSTRACT

An armored DSS cable includes: an inner layer part including a first rope helically wound; and a surface layer part including an optical fiber module and a plurality of third ropes, the optical fiber module having an optical fiber and a plurality of second ropes helically surrounding the optical fiber and having a smaller outer diameter than the first rope, the third ropes having a larger outer diameter than the first rope, such that the optical fiber module and the third ropes are arranged on an identical circle and helically wound, wherein the inner layer part and the surface layer part are formed concentrically.

20 Claims, 13 Drawing Sheets

(56) References Cited

U.S. PATENT DOCUMENTS

| | | | | |
|---|---|---|---|---|
| 2014/0056553 | A1* | 2/2014 | Villiger | G01K 1/14 |
| | | | | 385/12 |
| 2015/0285626 | A1 | 10/2015 | Yamauchi et al. | |
| 2018/0113009 | A1 | 4/2018 | Bednarski et al. | |
| 2019/0310077 | A1* | 10/2019 | Kishida | G01L 1/242 |

FOREIGN PATENT DOCUMENTS

| | | | |
|---|---|---|---|
| JP | 2000352109 A | | 12/2000 |
| JP | 2015145592 A | | 8/2015 |
| JP | 2019070594 A | | 5/2019 |
| KR | 20170008949 A | * | 1/2017 |
| WO | 2014083989 A1 | | 6/2014 |

OTHER PUBLICATIONS

Okubo et al, "Development of measurement technology for PC-distribution of tensioning force using optical fiber that is applicable to control of prestressing and maintenance", Journal of JSCE E2, 2020, pp. 41-54, vol. 76, No. 1.

* cited by examiner

FIG. 1

| USAGE PERIOD | MAIN DAMAGE CAUSE | SOLUTION |
|---|---|---|
| LESS THAN 1 YEAR | MECHANICAL DAMAGE AT TIME OF INSTALLATION (MECHANICAL PROBLEM) | • REDUCE CABLE DIAMETER<br>• CABLE HAS STEEL STRUCTURE OVER ENTIRE SURFACE<br>• MAKE NO CONNECTION POINTS IN CABLES ON SITE<br>• USE EASY INSTALLATION METHOD FOR CABLE |
| 20-30 YEARS | DEFORMATION AND CRACK IN STRUCTURE, DEFORMATION OF CONNECTION PART (MECHANICAL PROBLEM) | • KEEP STRAIN OCCURRING AT TIME OF INSTALLATION WITHIN SAFETY RANGE OF STEEL AND FO<br>• ENSURE FUNCTION EVEN WHEN CRACK OF STRUCTURE REACHES WIDTH OF 3 mm<br>• MAKE NO CONNECTION PARTS INSIDE STRUCTURE, KEEP INITIAL INSTALLATION STRAIN WITHIN SAFETY RANGE<br>• SUFFICIENTLY PROTECT EXIT FROM STRUCTURE |
| MORE THAN 20 YEARS | DETERIORATION AND CORROSION (CHEMICAL PROBLEM) | • KEEP DETERIORATION OF POLYMER PART OF FOC WITHIN NEGLIGIBLE RANGE IN TERMS OF PERFORMANCE<br>• AVOID USING DIFFERENT METALS, TO PREVENT ELECTRICAL CORROSION<br>• USE METAL HAVING CORROSION RESISTANCE UNDER OXYGEN ENVIRONMENT<br>• USE SPECIAL METAL UNDER SEAWATER ENVIRONMENT<br>• TAKE MEASURES FOR ALLOWING FO TO ADAPT TO HYDROGEN OR WATER ENVIRONMENT |

CABLE CHARACTERISTICS COMPARISON TABLE

| CABLE TYPE | OUTER SIZE (mm) | STRENGTH (N) | SENSITIVITY TO MINUTE STRAIN | GREAT-DEFORMATION RESISTANCE |
|---|---|---|---|---|
| COLUMNAR TYPE (COMPANY A) | 7.2 φ | 230 | LOW | POOR |
| COLUMNAR TYPE (COMPANY B) | 5 φ | 2350 | LOW | POOR |
| EMBOSSED TYPE (COMPANY C) | 4.3 × 1.7 | 250 | HIGH | POOR |

FIG. 6
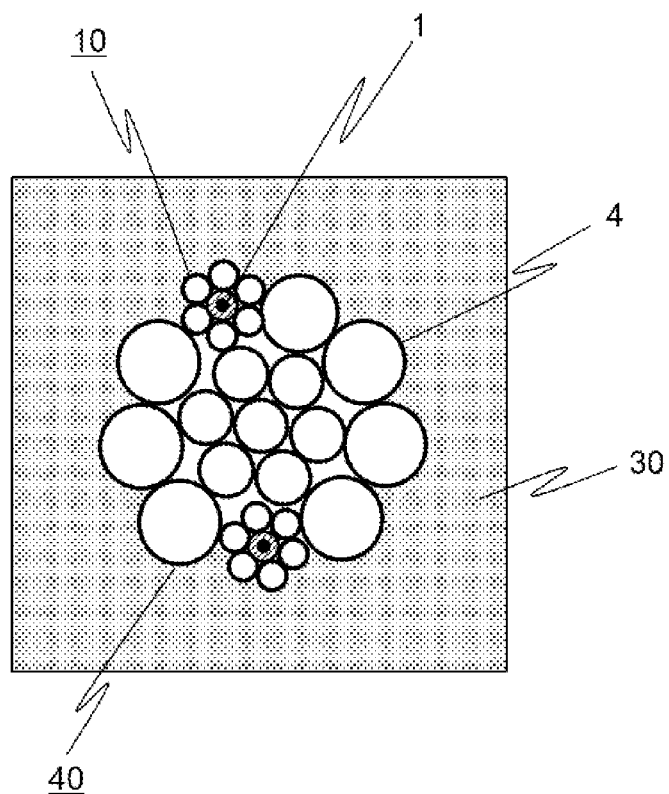
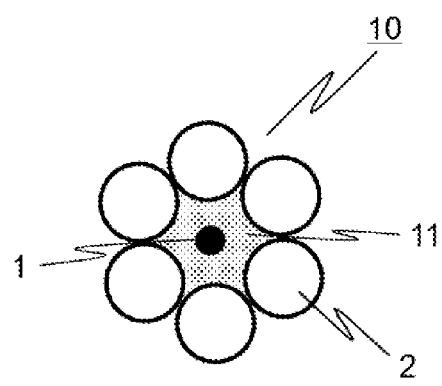
FIG. 7A
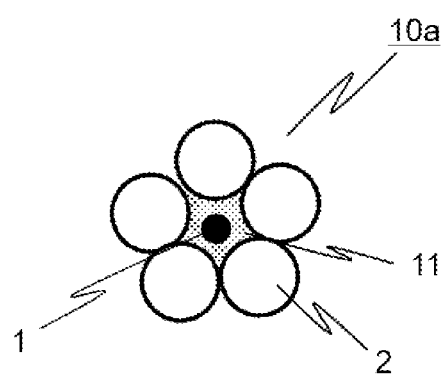
FIG. 7B

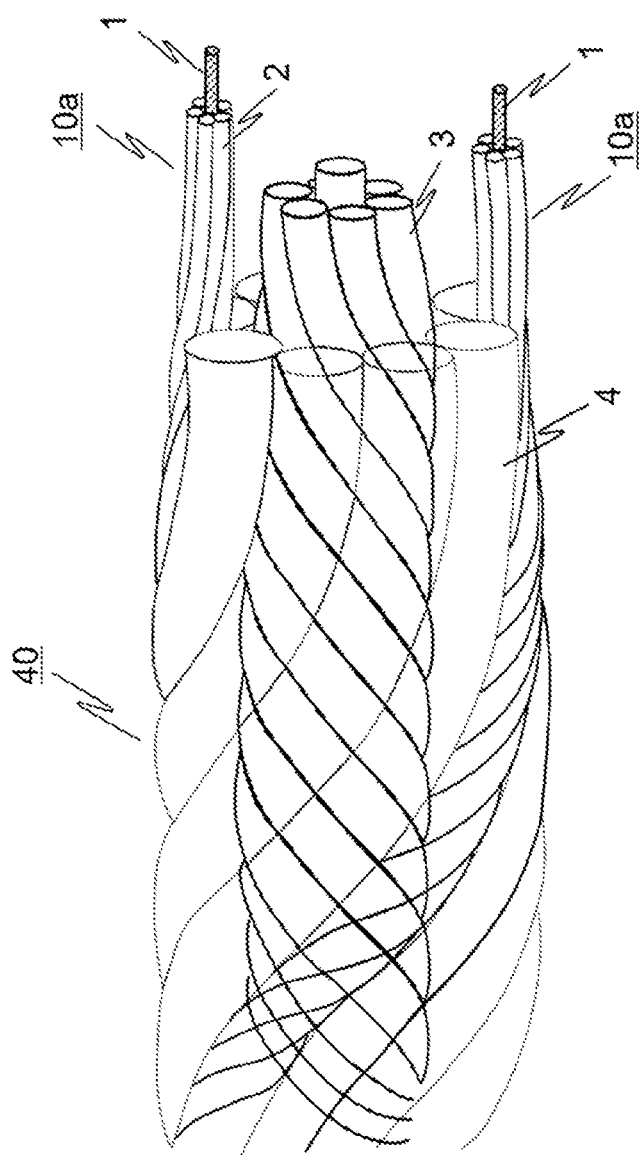
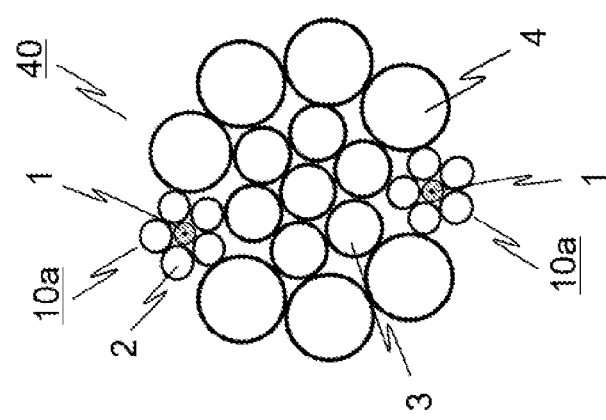
FIG. 11B
FIG. 11A

FIG. 12

MINIMUM ROPE OUTER DIAMETER CALCULATION EXAMPLE (VALUE UNIT: mm)

| WIRE TYPE | OD SPECIFICATIONS | WIRE SPECIFICATIONS | | | FO OUTER DIAMETER | |
|---|---|---|---|---|---|---|
| | ROPE OUTER DIAMETER | WIRE TYPE | | OUTER DIAMETER | EXAMPLE 1 | EXAMPLE 2 |
| TYPE 1 | 1.2 | 6×1 WIRES | | 0.4 | 0.25 | 0.21 |
| | | HOLE SIZE (WIRE ID) | | 0.4 | | |
| TYPE 2 | 1.2 | 5×1 WIRES | | 0.442 | | |
| | | HOLE SIZE (WIRE ID) | | 0.317 | | |

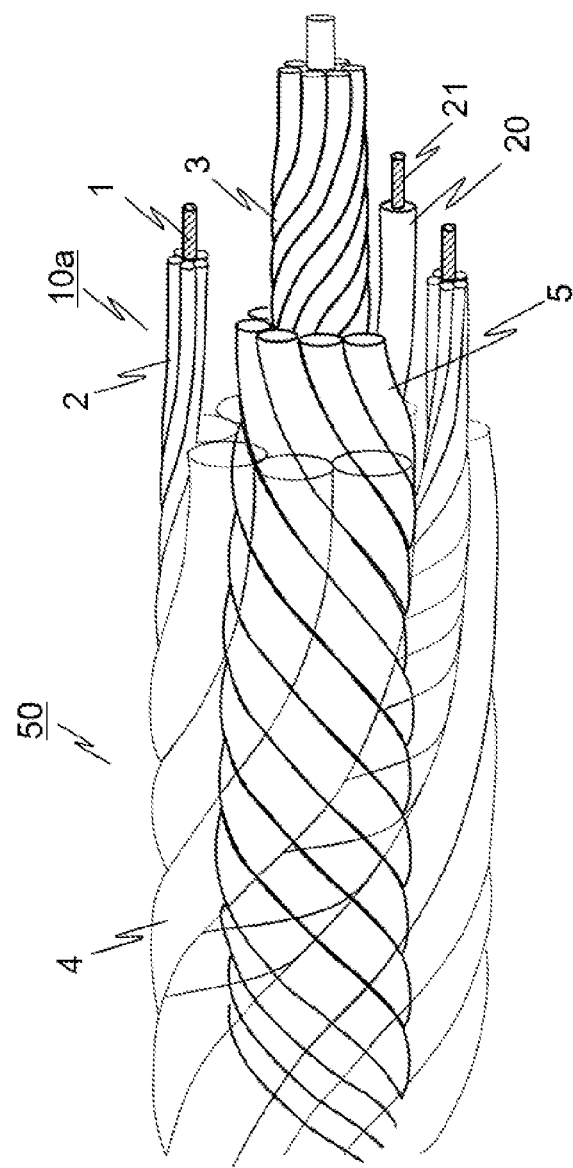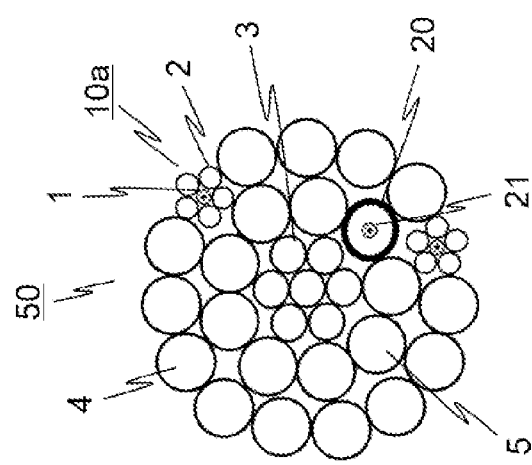
FIG. 15B
FIG. 15A

ARMORED DSS CABLE

TECHNICAL FIELD

The present disclosure relates to an armored DSS cable.

BACKGROUND ART

Distributed fiber optic sensing (DFOS) technology is being developed for practical use. This technology is being developed over a wide variety of aspects such as deformation, temperature, sound wave, and pressure, and has achieved 13 nε (nano strain) for accuracy, 2 cm for a distance resolution, and several ten km for a measurement distance, thus reaching a practical level.

In particular, in civil engineering work, the DFOS technology is expected to be applied throughout a range including monitoring of installation quality and maintenance/management after completion of work.

With the DFOS technology, the life might reach 100 years, but there have been no actual cases where manufacturing has been made with the life verified.

Meanwhile, in terms of cable designing, the following matters are required. The first matter is that manufacturing can be performed at proper cost, the second matter is that manufacturing can be performed with the existing equipment, the third matter is that an accurate measurement result of strain in both compression and tension can be obtained in a desired deformation range, the fourth matter is to have stable characteristics for facilitating connection in both optical and mechanical senses, the fifth matter is that handling in transportation or on site is easy, the sixth matter is to be human-friendly and safely operable, and the seventh matter is to have a sufficient strength even in a case of installation in cement.

In particular, regarding the life of a DSS cable (DSS is abbreviation for distributed strain sensing), a main damage cause as a problem and a solution therefor differ depending on the usage period, as described below, and it is necessary to change the coping method in accordance with the usage period (see FIG. 1).

First, in a case where the usage period is not more than one year, mechanical damage at the time of installation becomes a problem. This is addressed as follows. Firstly, the cable diameter is reduced. Secondly, the cable is formed by a titanium wire material or a steel structure over the entire surface. Thirdly, no connection points are made in cables on site. Fourthly, an easy installation method is used.

Next, in a case where the usage period is required to be 20 to 30 years, there are mechanical problems such as deformation or crack in a cable structure and deformation of a connection part. These are solved by the following methods. Firstly, cable strain occurring at the time of installation is kept within a prescribed strain range of steel and an optical fiber (hereinafter, may be referred to as FO). Secondly, an optical fiber cable (FOC) is ensured to function even when crack reaches a width of 3 mm. Thirdly, no connection parts are made inside the cable structure, in other words, the initial installation strain is kept within a prescribed range. Fourthly, an exit part from a buried part to a surface is sufficiently protected.

Finally, in a case where the usage period is more than 20 years, there are chemical problems such as deterioration or corrosion of a cable structure. These are solved by the following methods. Firstly, measures for suppressing deterioration of plastic parts of an optical fiber cable are taken. Secondly, usage of different kinds of metals is avoided, to prevent corrosion between different kinds of metals. Thirdly, a metal material having corrosion resistance against oxygen is used. Fourthly, in a seawater environment, a special metal material (having seawater resistance) should be used, and in a hydrogen environment or a water environment, measures for adapting to such an environment are taken (for example, carbon coating is employed).

Among the above problems, in particular, important problems to be considered for designing the DSS cable are a problem of evaluation for strain occurring by a load applied to a structure, i.e., a problem relevant to quality management, and a problem of maintenance management for maintaining a favorable quality during a usage period of more than 20 years, and both problems need to be solved (see, for example, Non-Patent Document 1).

For evaluating the magnitude of strain in the former problem, a (long-term) stable joining property between the FO and a structure such as a cable to which the FO is provided becomes a problem (see FIG. 2 and circled characters a, b, c in FIG. 2). The reason is that this influences the transfer characteristics of strain from a measurement object to the cable. In addition, in measurement for strain, in terms of quality management in installation of the DSS cable, i.e., in a case of installing the cable at a measurement object on site, in terms of "FOC sensing" as well as "ease of installation", the following is considered. That is, since changes in temperature and strain both bring change to a measured optical signal, in terms of ensuring strain measurement accuracy, it is necessary to realize a measurement object evaluation method that enables measurement while discriminating the influences of temperature change and strain change from each other. Further, in terms of maintenance management of measurement accuracy after installation, the following is considered. That is, after the DSS cable is installed, when environmental change such as vibration occurs, a situation such as occurrence of large crack to a certain extent in the measurement object is assumed, and even under such a situation, it is necessary to, for example, ensure such a measurement method that does not influence the life and does not influence measurement accuracy for a part other than the cracked part (see circled character d in FIG. 2).

In order to solve the above problems, conventionally, armored optical fiber cables (hereinafter, an optical fiber cable may be abbreviated as FOC) having the following structures have been developed. Hereinafter, the features of the cables as conventional cases will be described with reference to a cable comparison table shown in FIG. 3.

First, a problem of the armored FOC manufactured by Company A is that resistance against great deformation such as cable bending is poor and sensitivity to minute strain is low. The reason for the latter point is that the structure in which the optical fiber (hereinafter, may be abbreviated as FO) is provided on the inner side of the cable, specifically, the FO of the cable is surrounded by a plurality of steel wires arranged in an annular shape therearound, has a lower sensitivity to minute strain as compared to a case where the FO is provided at the cable surface.

Next, the armored FOC manufactured by Company B also has a similar problem. That is, when, for example, the cable is installed at a place where crack can occur, the cable has poor resistance against great deformation (the cable is severed by great deformation). In addition, as in the above case, the FO of the cable is surrounded by six steel wires formed in a hexagonal shape therearound, and a flexible plastic layer is further provided on the outer side thereof.

Thus, sensitivity to minute strain in a measurement object is lower as compared to a case where the FO is provided at the cable surface.

Unlike a cable having a circular outer shape as in the above two companies, an embossed-type cable having a rectangular outer shape is also developed. The embossed-type cable has poor resistance against great deformation, as in the above two types of cables. In addition, the cable strength is as low as that of the above-described armored FOC manufactured by Company A.

CITATION LIST

Non-Patent Document

Non-Patent Document 1: OKUBO, et al., "DEVELOPMENT OF THE MEASURING METHOD FOR PC-TENSILE FORCE DISTRIBUTION BY OPTICAL FIBER APPLICABLE TO CONTROL OF PRE-STRESSING AND MAINTENANCE OF PC STRUCTURES", JSCE transactions E2 (material and concrete structure), Vol. 76, No. 1, 41-54, 2020

PATENT DOCUMENT

Patent Document 1: WO2014/083989

SUMMARY OF THE INVENTION

Problems to be Solved by the Invention

For solving the problems described above, first, a matter of a joining property between the above-described FO and the structure such as the cable to which the FO is provided, which is a particularly important matter for improving measurement sensitivity, will be described below.

Regarding sensitivity to minute strain described above, it has been found that there is a new problem that sensitivity differs when the provided location of the FO in the cable changes. This will be described with reference to FIGS. 4 and 5. Here, FIG. 4 is a sectional view of a well illustrating the provided location of an FOC 100 having the FO, and FIGS. 5A and 5B show measurement results of strain measured using two types of FOs provided at different locations in the FOC 100. In this example, the FOC is formed by collection of a plurality of layers in which a plurality of steel wire ropes are arranged in an annular shape.

As shown in FIG. 4, the FOC is provided in a side wall 102 which is an annular cement part provided on the outer side of an annular casing 101 of the well, and minute strain occurring in the casing 101 forming the well is measured by the FO that the FOC 100 has.

In this case, actual measurement examples in which strain occurring in the casing 101 was detected by the FO are shown in FIGS. 5A and 5B. These two graphs show the change amount of strain detected by the FO when a load was applied stepwise to a measurement object and the load was removed stepwise. In the graphs, dotted lines indicate actual measurements when the load was applied (the load was increased stepwise from zero to a certain value), and solid lines indicate actual measurements when the load was removed (the load was decreased stepwise from the certain value to zero).

Of the two drawings (FIGS. 5A and 5B), FIG. 5A shows a measurement result of strain in a case where the FO is formed at an inner layer part of the FOC 100, and FIG. 5B shows a measurement result of strain in a case where the FO is formed at a surface layer part of the FOC 100.

From these measurement results, it is found that minute strain of about 5 p could be detected in both of FIGS. 5A and 5B. On the other hand, measurement of strain distribution differs between the two drawings. In FIG. 5A, only measurement data of small strain values not greater than 5$\mu\varepsilon$ is shown, and thus it is inferred that measurement could not be accurately performed so as to follow actual strain change, whereas in FIG. 5B, measurement data following strain change up to a great strain value not less than 20$\mu\varepsilon$, including minute strain not greater than 1$\mu\varepsilon$, is shown, and thus it is inferred that actual strain distribution could be accurately measured. In this case, it is found that the maximum value of measured strain in FIG. 5A is about ½ of the maximum value of measured strain in FIG. 5B.

From the above results, it is found that the FO needs to be provided at a surface layer part of the FOC 100 in a case of measuring such strain change that strain indicates a small value of about 10$\mu\varepsilon$.

The present disclosure has been made to solve the above problem, and an object of the present disclosure is to provide an optical fiber cable that, in order to establish an evaluation method for performing quality management and maintenance management of a measurement object in a civil engineering work, among matters required in designing for the optical fiber cable for measuring a deformation degree of the measurement object, in particular, satisfies two matters that it is possible to perform such precise and accurate measurement as to allow evaluation of both a tensile force and a compressive force applied to the measurement object, and that measurement accuracy can be maintained over a long period in a case where the optical fiber cable is installed under an installation environment such as cement.

Solution to the Problems

An armored DSS cable according to the present disclosure includes: an inner layer part including a first rope helically wound; and a surface layer part including an optical fiber module and a plurality of third ropes, the optical fiber module having an optical fiber and a plurality of second ropes helically surrounding the optical fiber and having a smaller outer diameter than the first rope, the third ropes having a larger outer diameter than the first rope, such that the optical fiber module and the third ropes are arranged on an identical circle and helically wound, wherein the inner layer part and the surface layer part are formed concentrically.

Effect of the Invention

The armored DSS cable according to the present disclosure makes it possible to provide an optical fiber cable that, in order to establish an evaluation method for performing quality management and maintenance management of a measurement object in a civil engineering work, among matters required in designing for the optical fiber cable for measuring a deformation degree of the measurement object, in particular, satisfies two matters that it is possible to perform such precise and accurate measurement as to allow evaluation of both a tensile force and a compressive force applied to the measurement object, and that measurement accuracy can be maintained over a long period in a case where the optical fiber cable is installed under an installation environment such as cement.

BRIEF DESCRIPTION OF THE DRAWINGS

FIG. 1 is a table illustrating problems relevant to the life of a DSS cable.

FIG. 6 is a sectional view illustrating the installation state of the armored DSS cable according to embodiment 1.

FIGS. 7A and 7B are model sectional views illustrating armored FO modules of the armored DSS cable according to embodiment 1.

FIGS. 11A and 11B are model views illustrating the structure of the armored DSS cable according to embodiment 1.

FIG. 12 is a table showing data for considering the minimum rope diameters of the two types of armored FO modules according to embodiment 1.

FIGS. 15A and 15B are model views illustrating the structure of an armored DTSS cable according to embodiment 2.

DESCRIPTION OF EMBODIMENTS

Embodiment 1

Figure 2:
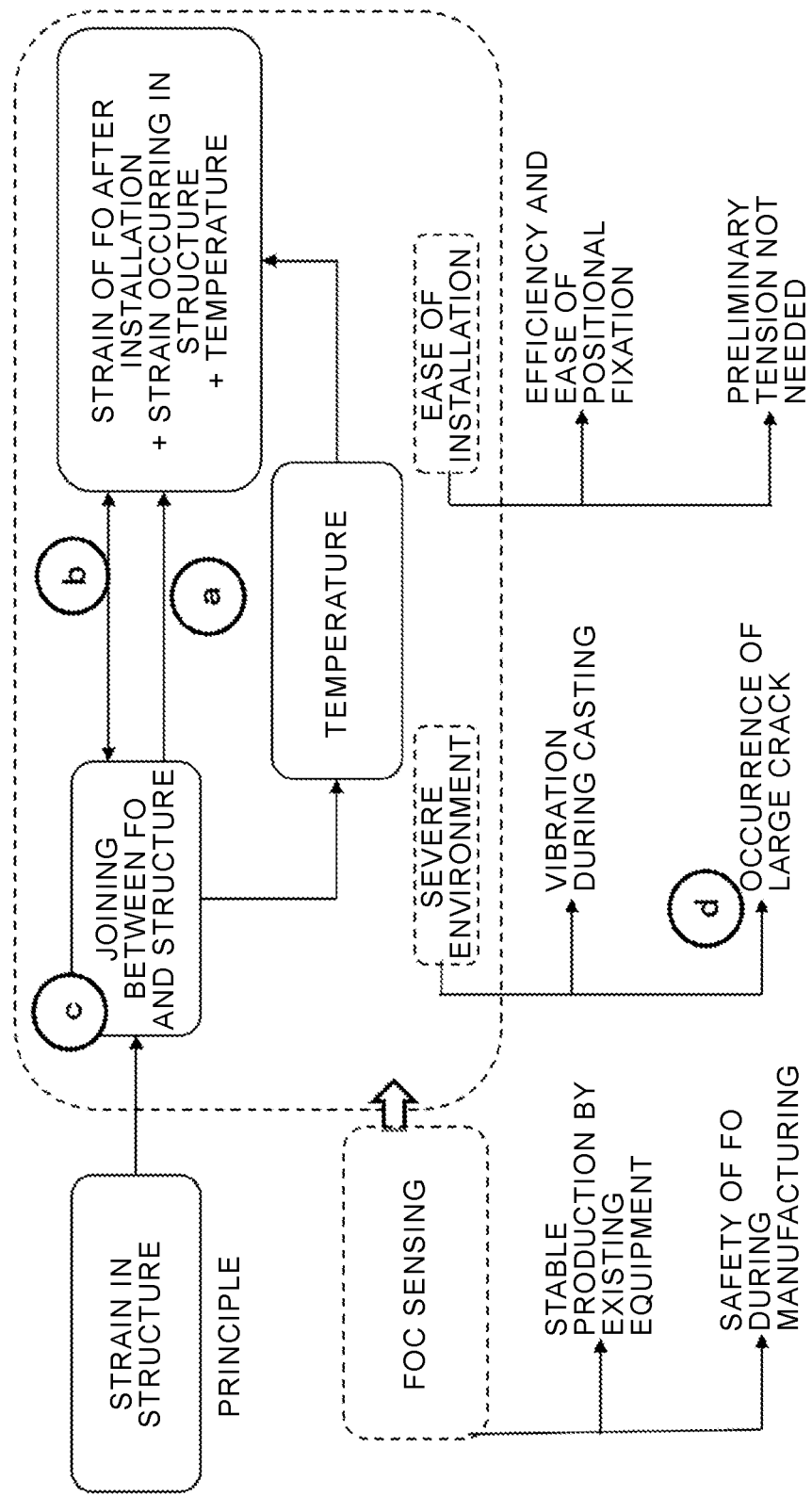
FIG. 2 illustrates problems in maintenance management of measurement accuracy of the DSS cable.

Hereinafter, an armored DSS cable of embodiment 1 will be described in detail with reference to FIGS. 6 to 15B.

First, an installation example of the armored DSS cable according to the present embodiment is shown in FIG. 6. As shown in FIG. 6, generally, in a civil engineering work, for measuring strain of a measurement object, a FOC such as an armored DSS cable 40 is often fixed with cement, and therefore it is necessary to ensure a joining property between the cement and the FOC. FIG. 6 is a model sectional view showing a state of experiment in which a block having a quadrangular prism shape is formed by pouring cement which is a surrounding member so as to surround the FOC so that the FOC is fixed by the block.

As shown in FIG. 6, an optical fiber 1 (hereinafter, may be abbreviated as "FO 1") which is a sensor for strain or the like is provided at a surface layer part of the armored DSS cable 40 (described later in detail) which is the FOC, and a cement block 30 which is the surrounding member is present so as to surround the armored DSS cable 40.

In this case, the surface layer part of the armored DSS cable 40 having a two-layer structure includes armored FO modules 10 (hereinafter, may be referred to as optical fiber modules 10) which are strain sensing structures each having the FO 1 at the inner center part, and ropes 4 (ropes 4 are formed by steel wires, for example), and is formed in an annular shape. Then, the cement forming the cement block 30 enters an outer-side part of the annular surface layer part, so that the armored DSS cable 40 is fixed by the cement. Thus, the optical fiber modules 10 of the armored DSS cable and the cement block 30 do not slip relative to each other. That is, strain can be accurately transferred. Meanwhile, there are no traces that the cement has entered the inner side of the surface layer part. Thus, it can be said that the structural characteristics of the FOC have independency and have such high stability that performance at the time of manufacturing can be ensured even after installation.

The reason why the armored DSS cable 40 is fixed in the above-described manner is as follows. If the joining property between a structure such as the armored DSS cable 40 and a surrounding structure to which said structure is provided is poor, when strain, temperature, or the like occurring in the measurement object which is the surrounding structure is measured by the FO 1 provided in the armored DSS cable 40, slip occurs between the measurement object and the armored DSS cable 40, so that transfer characteristics to the FO 1 are deteriorated, thus hampering accurate measurement. For preventing this, the above-described fixation is made.

Although a method for filling an area where the cement does not enter on the inner side of the surface layer part is not particularly prescribed in the above description, an area where it can be determined that the cement has not entered on the inner side of the surface layer part may be filled with resin containing rubber. Thus, corrosion of the cable can be prevented, whereby manufacturing can be performed more stably in an industrial sense and measurement accuracy is also stabilized.

In the above description, the necessity for fixation with the measurement object has been described using the armored DSS cable 40 having a two-layer structure as an example. However, without limitation thereto, such necessity also applies to a case of using, as the FOC, an armored DSS cable 50 having a three-layer structure described in detail in embodiment 2. The optical fiber 1 functions not only as a sensor for strain detection but also as a sensor for temperature detection.

Next, the armored FO module 10 having a sensor for strain detection, which is a component used in common between the armored DSS cable 40 and the armored DSS cable 50 which are the two types of FOCs described above, and the like, will be described in detail with reference to FIGS. 7A and 7B.

FIGS. 7A and 7B show sectional views of two types of armored FO modules taken along a plane perpendicular to the axial direction (long-side direction). FIG. 7A shows the armored FO module 10 having six ropes 2 (formed by steel wires, for example) and having the FO 1 at the center thereof, and FIG. 7B shows an armored FO module 10a having five ropes 2 (formed by steel wires, for example) and having the FO 1 at the center thereof. In both of the two drawings, resin 11 fills a gap between the FO 1 and the ropes 2, and the FO 1 is fixed to the rope 2 by the resin 11. In this case, the resin 11 has also a waterproof function. It is noted that, thus far, the former armored FO module 10 has been often used in actual measurement.

The plurality of ropes 2 that each of the two types of armored FO modules 10, 10a has are helically wound around the FO 1, to form a strand structure. The rope may be formed by a stainless steel wire whose surface is not coated with plastic, the material of the rope (may be referred to as strand) may be freely changed, and the rope can be adapted to a special environment by having corrosion resistance, for example. In addition, the rope has stable characteristics also in an optical sense.

Figure 8:
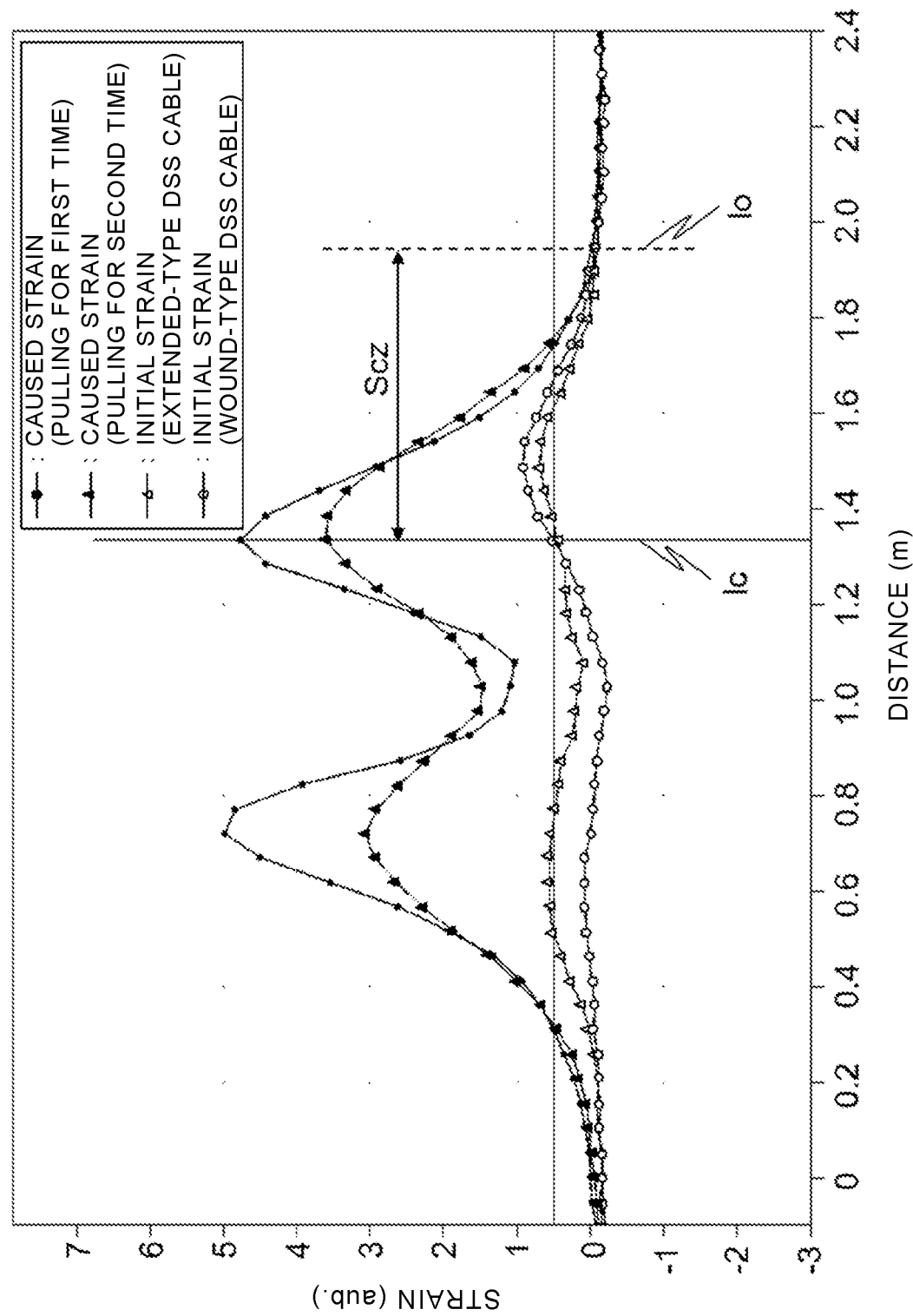
FIG. 8 illustrates the spatial resolution of the armored FO module according to embodiment 1.

Next, in order to confirm performance of the armored FO module 10, first, a tension test which is a basic characteristics test was conducted (the test was conducted by pulling by a hand). An example of an experiment result at this time will be described with reference to FIG. 8. In FIG. 8, the horizontal axis indicates the distance (unit: m) from a reference point to a measurement position, and the vertical axis indicates the magnitude of detected strain (arbitrary unit).

In FIG. 8, a curve with blank circles represents data (initial strain data) of strain before a tension test, obtained in a state in which the armored FO module 10 was wound, and a curve with blank triangles represents data (initial strain data) of strain before a tension test, obtained in a state in which the armored FO module 10 was extended. In addition, a curve with filled circles represents a result of a tension test for the first time, and a curve with filled triangles represents a result of a tension test for the second time. Further, a position lc indicated by a vertical solid line is the right-side one of two positions where the maximum strain values were measured in the tension test for the first time, and a position lo indicated by a vertical dotted line is a position where the strain was no longer changed. A distance Scz between these two positions is considered to represent the spatial resolution of the armored FO module 10.

From this result, it is found that, in a range rightward of the position lo (range where values on the horizontal axis are not less than approximately 2 m in the graph), there is no difference between strains occurring before and after the tension test. In addition, it is found that the strain value gradually decreases as its position becomes farther from the position indicating the maximum value. In addition, it is found that the maximum value of strain detected in the tension test for the second time is smaller than the maximum value of strain detected in the tension test for the first time.

From the above, it is found that, through the tension test, the FO 1 in the armored FO module 10 reacts at a shorter distance than the distance Scz (here, about 50 cm) but does not react at a distance longer than this, i.e., in this experiment result, the spatial resolution of the armored FO module 10 is represented by the distance Scz.

In addition, since strain detected by the FO 1 due to occurrence of strain in the measurement object is gradually suppressed, even if a part of the cable is subjected to large crack occurring in the measurement object, it is assumed that the influence on the FO 1 is only to a limited extent. That is, even if crack occurs in the measurement object, the range of influence on measurement of strain is expected to fall within a limited range, and therefore it can be assumed that there is no practical problem. It is noted that 50 cm which is the above value of Scz corresponds to 10 pitches in a case where the pitch of helix of the wound rope of the armored FO module 10 is 5 cm.

Figure 9A:
FIGS. 9A and 9B show measurement results of strain measured by the armored FO module according to embodiment 1, for investigating the influence of crack occurring in a measurement object on strain measurement.
Figure 9B:
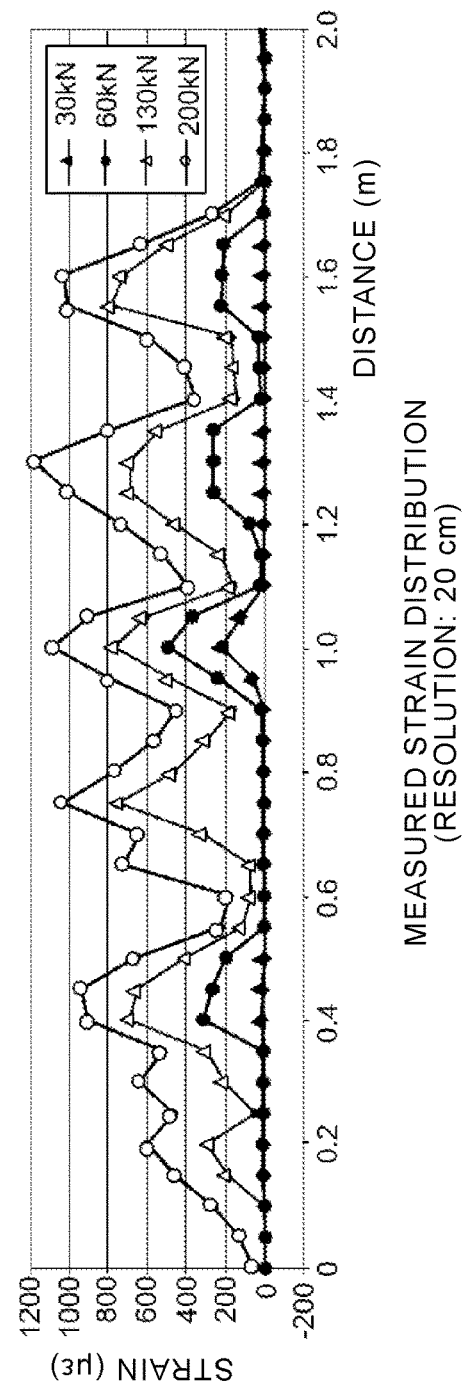

Next, an experiment result about the magnitude of strain occurring in the FO 1 when crack actually occurred in the measurement object will be described with reference to FIGS. 9A and 9B. FIGS. 9A and 9B show measurement results of strain detected using the armored FO module 10 when crack occurred in the measurement object (here, a cement block having a quadrangular prism shape).

Here, FIG. 9A shows a schematic view of crack patterns Cr1 to Cr7 at seven locations occurring in the measurement object due to a load of 60 kN. The width of crack measured in this case was 40μm at minimum.

FIG. 9B is a graph showing, for each load value, a measurement result of strain measured by the FO 1 composing the armored FO module 10, correspondingly to positions on the measurement object.

In FIG. 9B, a curve graph with filled triangles represents strain distribution detected under a load of 30 kN and corresponding to measurement positions on the measurement object, a curve graph with filled circles represents strain distribution detected under a load of 60 kN and corresponding to measurement positions on the measurement object, a curve graph with blank triangles represents strain distribution detected under a load of 130 kN and corresponding to measurement positions on the measurement object, and a curve graph with blank circles represents strain distribution detected under a load of 200 kN and corresponding to measurement positions on the measurement object. From the view showing cracks in FIG. 9A and the graph of the detection result of strain in FIG. 9B, it is found that strain was measured in proportion to the magnitude of the load on the measurement object correspondingly to the crack position. The position resolution in this case was 20 cm.

As a sensor for strain sensing, it is ideal that stiffness thereof (in plain words, difficulty in deformation), such as the Young's modulus (to be exact, the modulus of longitudinal elasticity), is equal to that of the measurement object (the same strain occurs under the same load). In the case of the armored FO module (strand structure) of embodiment 1, the stiffness thereof is 60 GPa, and in the case where the measurement object is concrete (cement material), the stiffness thereof is 30 to 60 GPa. On the other hand, the stiffness of a general steel material is about 200 GPa. Therefore, as compared to the general steel material, the armored FO module of embodiment 1 which has a strand structure is closer to ideal as a sensor for strain sensing.

Stability of the proof stress (stress corresponding to the yield point as a strength property of a material) in the long-side direction of the armored FO module is confirmed from the above description. However, in order to perform more accurate measurement, it is necessary to also investigate stability of the proof stress in the short-side direction (transverse direction) of the armored FO module (see, for example, Non-Patent Document 1).

Figure 10:
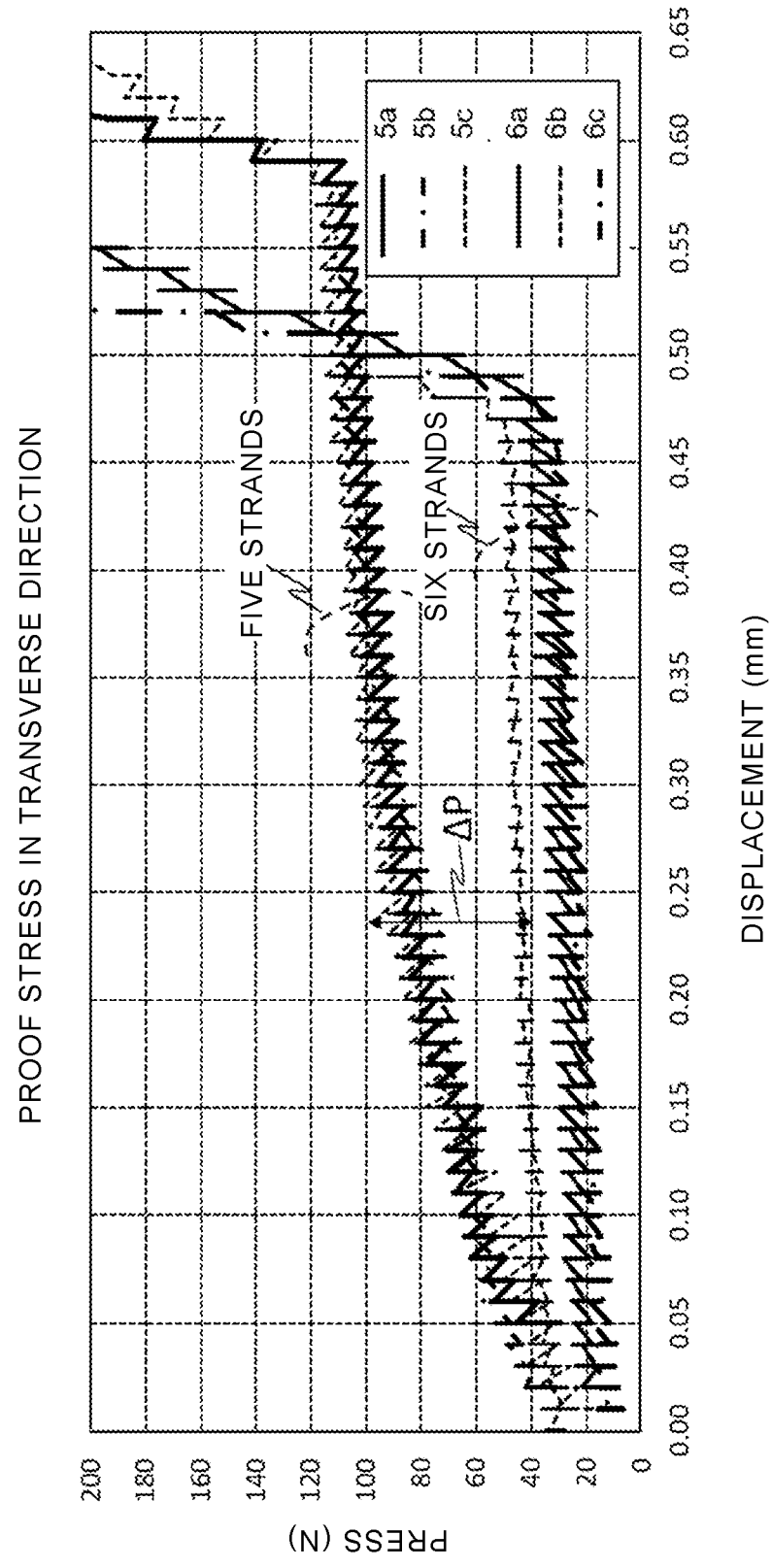
FIG. 10 shows comparison of proof stress in the transverse direction of two types of armored FO modules according to embodiment 1.

Accordingly, next, three samples were selected from each of the two types of armored FO modules 10, 10a described above, and using these samples, the proof stress in the short-side direction (transverse direction) was investigated. FIG. 10 shows the result thereof.

FIG. 10 shows a result of displacement in the transverse direction (indicated on the horizontal axis) with respect to press (indicated on the vertical axis), for the two types of armored FO modules. Specifically, as the samples of the armored FO module 10, three samples denoted by 6a, 6b, 6c were used, and as the samples of the armored FO module 10a, three samples denoted by 5a, 5b, 5c were used, to investigate displacement with respect to press.

As shown in the graph, it is found that, for both of the two types of armored FO modules 10, 10a, in a range of displacement up to 0.45 mm, displacement occurs almost stably with respect to press (press of up to about 40 N for the armored FO module 10, press of up to about 100 N for the armored FO module 10a).

However, from these points (hereinafter, referred to as critical points for the respective modules) as a boundary, even slight increase in stress caused significant increase in displacement, according to the measurement result. Specifically, regarding the two types of the armored FO modules 10, 10a, the proof stress of the armored FO module (module indicated as "six strands" in the graph) was about N, whereas the proof stress of the armored FO module 10a (module indicated as "five strands" in the graph) was 100 N. From this result, it is found that the armored FO module 10a has better proof-stress characteristics than the armored FO module 10. That is, it can be said that, as a measurement tool for strain, the armored FO module 10a with five ropes has higher proof-stress performance than the armored FO module 10 with six ropes.

Next, the armored DSS cable 40 having a two-layer structure in which the above armored FO modules 10a are located at the outermost layer part will be described with reference to FIGS. 11A and 11B. FIGS. 11A and 11B are structure model views illustrating the armored DSS cable 40. FIG. 11A illustrates the layer structure thereof, and FIG. 11B illustrates the three-dimensional structure thereof. In this case, FIG. 11A shows a sectional view perpendicular to a long-side direction (axial direction) of the armored DSS cable 40.

As shown in FIG. 11A, the armored DSS cable 40 is roughly composed of two elements which are an inner layer part having seven ropes 3 (formed by steel wires, for example) located at a center part, and a surface layer part in which seven ropes 4 (formed by steel wires, for example) and two armored FO modules 10a are arranged in an annular shape (as shown in the drawing, the surface layer part is the outermost layer part).

Figures 3, 4:
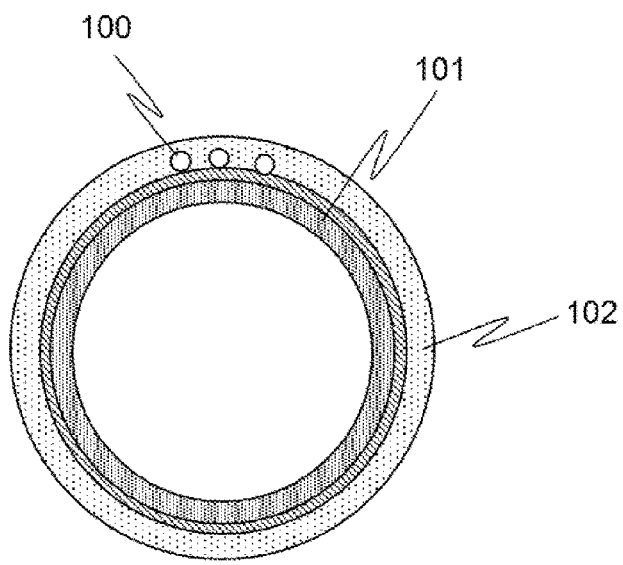
FIG. 3 is a table showing comparison of characteristics of a plurality of cables as conventional cases.
FIG. 4 is a sectional view showing the installation state of a FOC in a well, for illustrating problems of an armored DSS cable according to embodiment 1.
Figure 5:
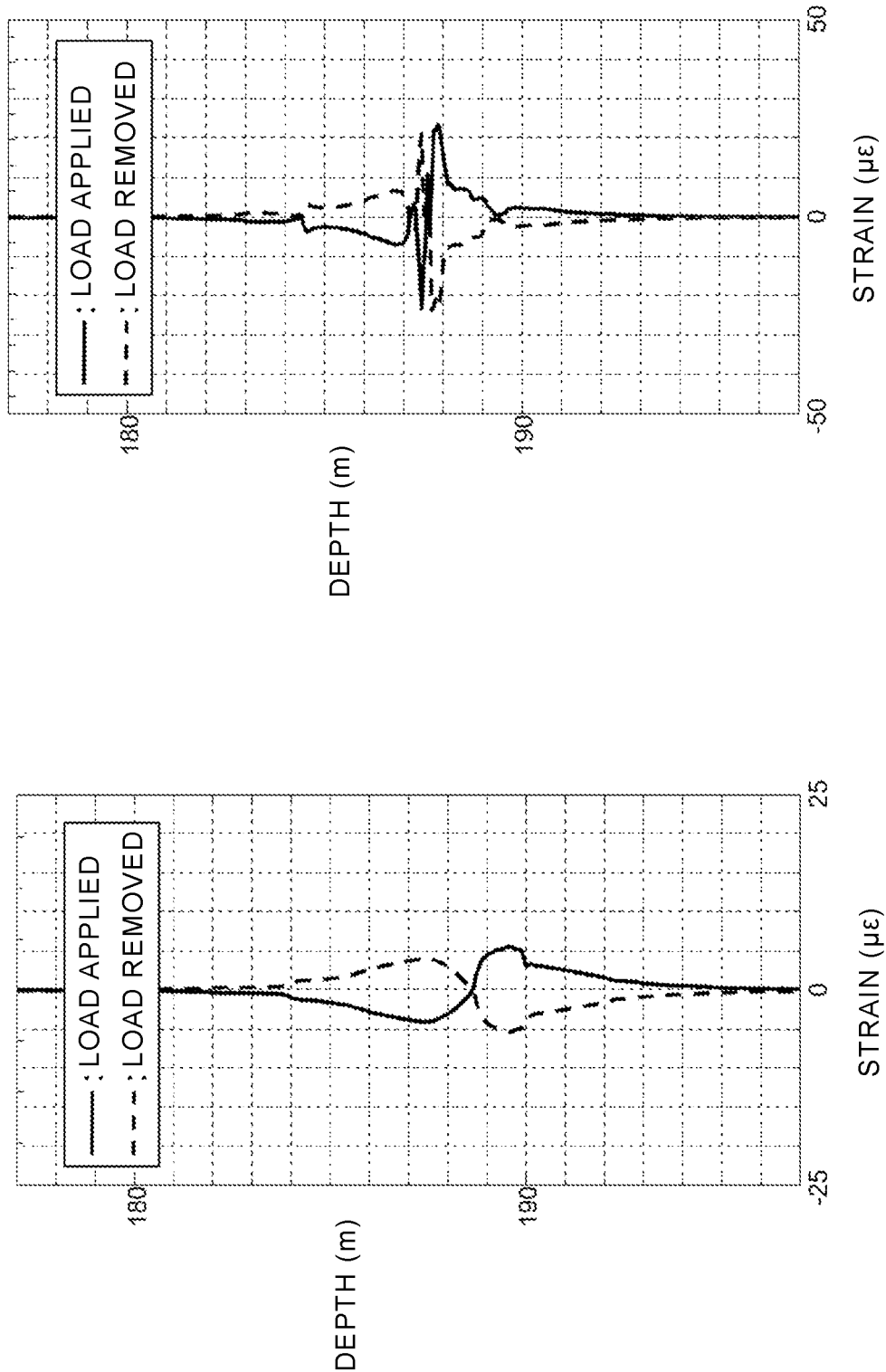
FIGS. 5A and 5B show measurement results of strain measured using the FOC in FIG. 4, for illustrating problems of the armored DSS cable according to embodiment 1.

Here, as shown in FIG. 11B, the ropes 2 surrounding the FO 1 composing the armored FO module 10a, the ropes 3, and the ropes 4 are all helically wound. The pitch of the helix in this case is set to 5 cm, for example. The outer diameter of the armored DSS cable 40 is 4.9 mm (for satisfying this value, for example, the rope 3 having an outer diameter of 0.81 mm and the rope 4 having an outer diameter of 1.2 mm may be used). Then, using the armored DSS cable 40 as described above, strain distribution can be measured. Normally, in measuring strain, it is assumed that the temperature of the measurement object differs depending on the measurement location. Therefore, as shown in FIGS. 11A and 11B, two armored FO modules 10a are used as one set. Regarding the armored DSS cable 40 of embodiment 1, values corresponding to the cable characteristics of the conventional cases shown in FIG. 3, except for the outer size described above, are as follows. The mechanical strength is 13000 N, sensitivity to minute strain is high, and the armored DSS cable 40 has resistance to great deformation. It is found that all these characteristics are superior to those of the conventional cases. In terms of the life, the ropes 2, the ropes 3, and the ropes 4 described above may be formed by stainless steel wires instead of mere steel wires.

Further, the outer diameter of the FO shown in FIGS. 11A and 11B is approximately 0.25 mm. Under this condition, examples of calculation of the minimum rope outer diameter are shown in FIG. 12.

FIG. 12 shows a result of calculation of each of the outer diameter sizes of the above two types of armored FO modules 10, 10a (in FIG. 12, the former one is referred to as type 1 in wire type and the latter one is referred to as type 2 in wire type). For each module, the rope outer diameter is calculated as follows.

First, in the type 1, the outer diameter of each of the six wires is 0.4 mm, and where, on the inner side surrounded by the six wires, the outer diameter of a circle tangent to the outer circumferences of the six wires is referred to as hole size, the hole size is 0.4 mm. Therefore, the rope outer diameter of the type 1 is 2×(each wire outer diameter+hole size/2)=2×(0.4+0.4/2)=1.2 mm. Similarly, for the wires of type 2, the rope outer diameter is 2×(0.442+0.317/2)≈1.2 mm.

To sum up, it is found that the rope outer diameter is 1.2 mm for both types, i.e., both of the two types of armored FO modules 10, 10a (in other words, it can also be said that the outer diameter of the armored FO module can be set to not less than 1.2 mm). In addition, since the hole size is greater than 0.25 mm, the FO having either of outer diameters shown in Example 1 and Example 2 can be used. Further, it is found that the outer diameter of the wires of type 2 can be set to a larger size as compared to the wires of type 1. Also from this, it can be said that the outer diameter of the armored FO module can be set to not less than 1.2 mm.

By adopting the structure as described above, it is possible to provide an armored DSS cable for measuring strain and temperature of a measurement object, the above-described effects that: joining performance with the measurement object, e.g., concrete in a civil engineering work, can be ensured using the strand structure at the surface; since the armored FO modules 10 or the armored FO modules 10a are located at the surface, strain, temperature, or the like of the measurement object can be measured with high sensitivity; by using a Rayleigh measurement method and a Brillouin measurement method, it is possible to perform such high-accuracy measurement as to measure temperature and strain separately at the same time, even if a dedicated sensor for detecting temperature is not provided (see, for example, Patent Document 1); and wire disconnection does not occur by local crack.

Figure 13:
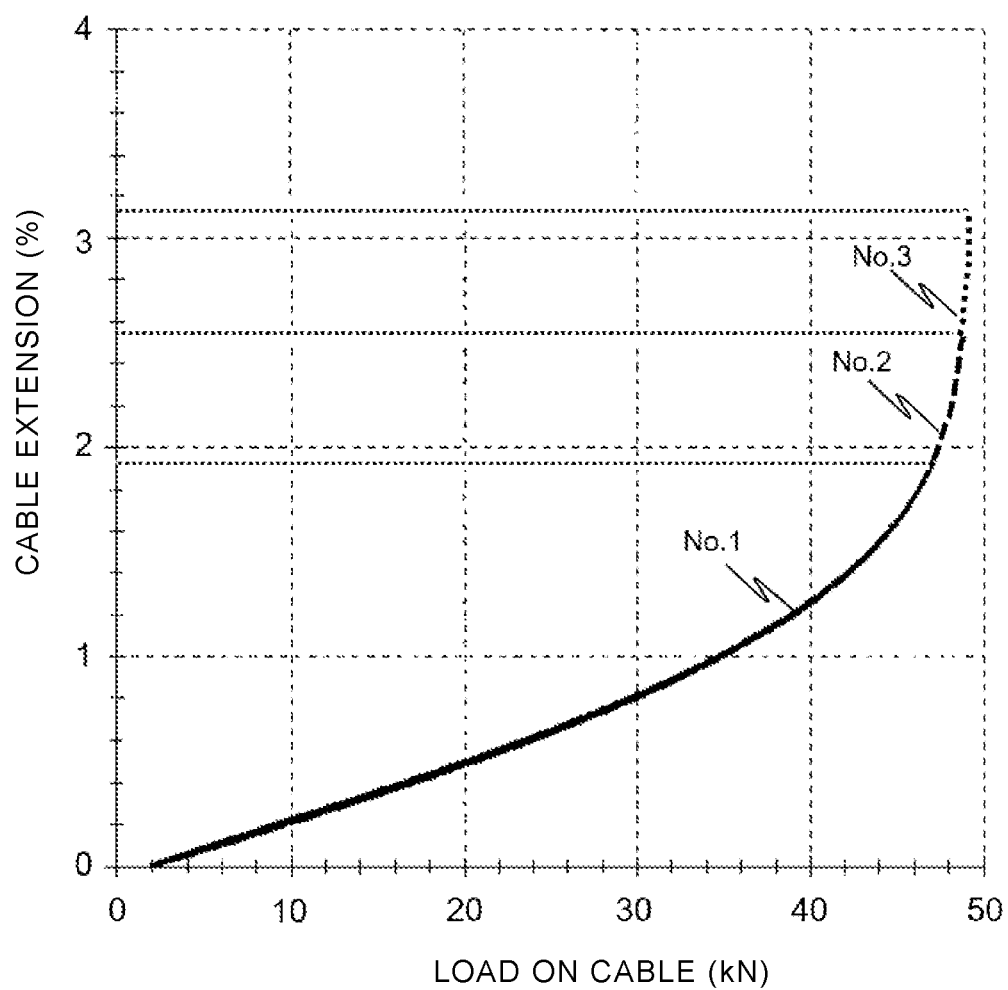
FIG. 13 shows a result of a tension test for the armored DSS cable according to embodiment 1.

Accordingly, next, in order to confirm characteristics that the above armored DSS cable has, a tension test which is a basic test was conducted. A result thereof is shown in FIG. 13. As shown the graph, three samples (No. 1 to No. 3) were used in the test. As shown in FIG. 13, extension of more than 1.5% was exhibited with respect to a load on the cable, and as shown in the graph, it is found that a linear extension range reaches about 1% in the case of using the strand structure, though a linear extension range of a general steel material is not more than 0.1%.

Thus, the result of the tension test of the armored DSS cable 40 has been described. Next, a case of subjecting the armored DSS cable 40 to a compression test will be described.

Figure 14:
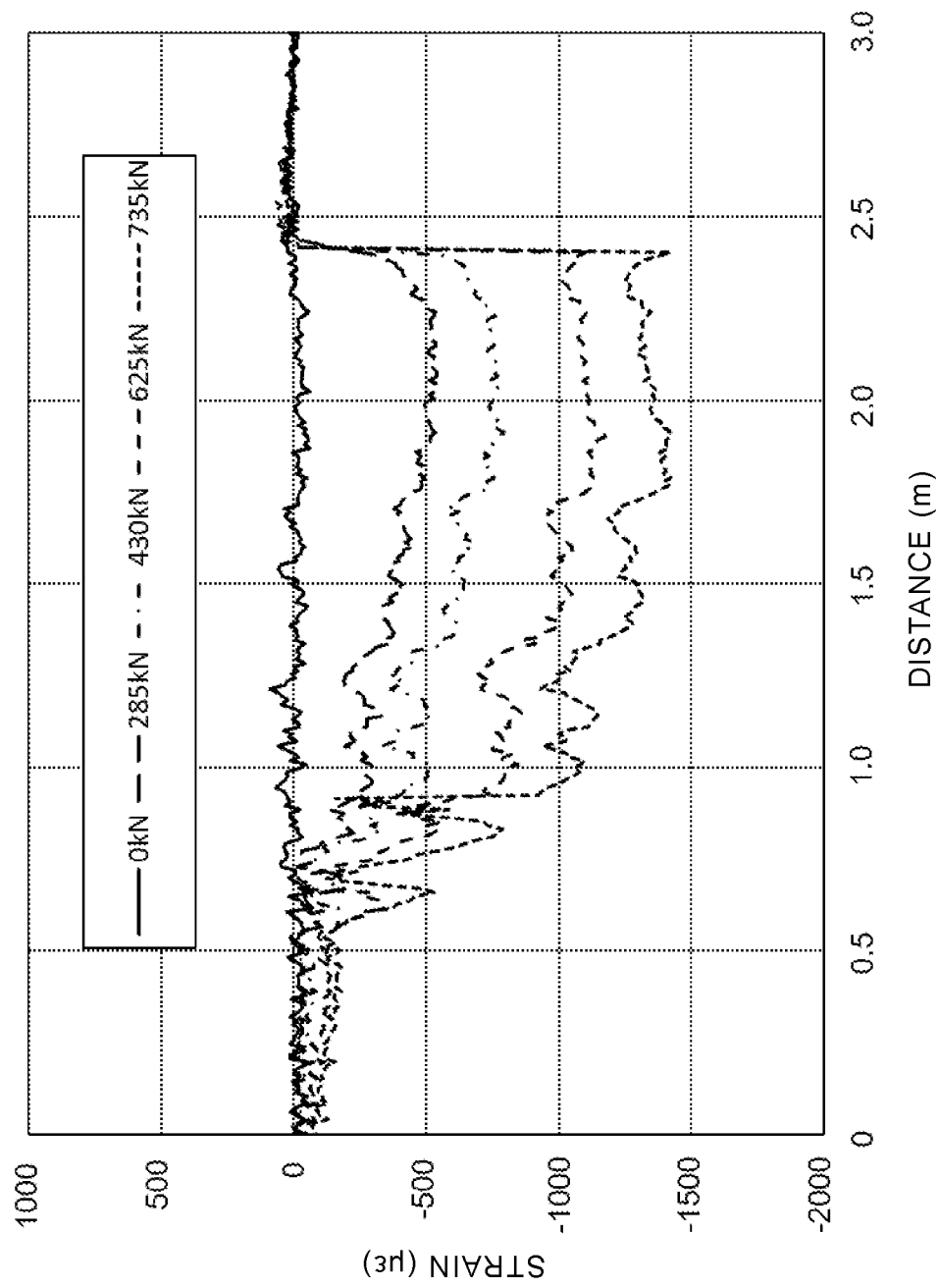
FIG. 14 shows a measurement result of strain distribution when compressive stress acts on the armored DSS cable according to embodiment 1.

FIG. 14 is a graph showing an example of a measurement result of strain distribution in a case of measuring strain occurring in a measurement object by the FO provided in the armored DSS cable 40, with the measurement object compressed. In FIG. 14, the horizontal axis indicates the measurement position on the measurement object by the distance from a reference point, and the vertical axis indicates the measured strain value. In the graph, a result of measured strain distribution is shown for each of five kinds of loads applied to the measurement object.

In FIG. 14, the topmost curve in the graph represents strain distribution under no load (load=zero), the second curve from the top represents strain distribution under a load of 285 kN, the third curve from the top represents strain distribution under a load of 430 kN, the fourth curve from the top represents strain distribution under a load of 625 kN, and the bottommost curve represents strain distribution under a load of 735 kN.

As shown in the graph, in a range from a distance 1.0 m to a distance 2.4 m, strain distribution proportionally changes in accordance with the five kinds of stress values, and thus it is assumed that strain distribution occurring in the measurement object could be correctly measured. In this case, values in strain distributions for the five kinds are all minus values, and thus it is inferred that the values were correctly measured as compressive forces to the measurement object.

As described above, according to the armored DSS cable of embodiment 1, it can be inferred that this armored DSS cable is an optical fiber cable satisfying the following two matters: since the armored FO module is located at the outermost layer part, it is possible to perform such precise and accurate measurement as to allow evaluation of both a tensile force and a compressive force applied to the measurement object; and in a case where the optical fiber cable is provided in an installation environment such as cement, a crack width of up to 40μm can be detected, and meanwhile, it can be expected that the cable life lasts until a fissure opening becomes 3 mm, and therefore measurement accuracy can be maintained over a long period more than 20 years. In addition, using the above armored FO module 10a enables measurement with higher performance as compared to a case of using the armored FO module 10.

Embodiment 2

Next, an armored DSS cable according to embodiment 2 will be described in detail with reference to FIGS. 15A and 15B.

In the above description, using the armored DSS cable 40 having a two-layer structure including an optical fiber mainly for strain sensing, the features and the effects thereof have been described. Meanwhile, in embodiment 2, an armored DSS cable 50 having a three-layer structure (structure having an intermediate layer part between an inner layer part and a surface layer part) further including, in combination, an optical fiber having only a function as a temperature sensor, will be described below in detail, focusing on difference from the above armored DSS cable 40.

FIGS. 15A and 15B are structure models illustrating the armored DSS cable 50. FIG. 15A illustrates the layer structure thereof, and FIG. 15B illustrates the three-dimensional structure thereof. In this case, FIG. 15A shows a sectional view perpendicular to the long-side direction (axial direction) of the armored DSS cable 50.

As shown in FIG. 15A, the armored DSS cable 50 is roughly composed of three elements which are an inner layer part having seven ropes 3 (among them, six ropes surround one rope as a center axis) located at a center part, an intermediate layer part in which eight ropes 5 (formed by steel wires, for example) and one FIMT temperature module 20 as a temperature sensing structure are integrally arranged in an annular shape, and a surface layer part in which thirteen ropes 4 and two armored FO modules 10a are integrally arranged in an annular shape (as shown in the drawing, the surface layer part is the outermost layer part).

Here, as shown in FIG. 15B, the eight ropes 5 and the FIMT temperature module 20 (FIMT is abbreviation for fiber metallic tube) including a temperature sensor 21, which form the intermediate layer part, are all helically wound, as with the above-described components in the inner layer part and the outer layer part (these have already been described in embodiment 1 and therefore the detailed description thereof is omitted here). In addition, the outer diameter of the armored DSS cable 50 is 7.3 mm (for satisfying this value, for example, the FIMT temperature module 20 and the rope 3 having an outer diameter of 1 mm, and the rope 5 having an outer diameter of 1.2 mm, may be used). The ropes may be formed by stainless steel wires, in terms of life.

Using the armored DSS cable 50 as described above, it is possible to measure temperature distribution in addition to strain distribution of the measurement object. Therefore, the armored DSS cable 50 shown in FIGS. 15A and 15B can also be referred to as armored DTSS cable. Here, DTSS is abbreviation for distributed temperature and strain sensing.

By adopting the structure as described above, it is possible to provide an armored DSS cable for a sensor of strain and temperature of a measurement object, having the above-described effects that: joining performance with the measurement object, e.g., concrete in a civil engineering work, can be ensured using the strand structure at the surface; since the armored FO modules 10a are located at the surface and the FIMT temperature module 20 is located in a layer close to the surface, strain, temperature, or the like of the measurement object can be measured with high sensitivity; by using the armored FO modules 10a and the FIMT temperature module 20 in combination, it is possible to perform high-accuracy measurement while separating temperature and strain, only with a Rayleigh measurement method without using a Brillouin measurement method (see, for example, Patent Document 1); and wire disconnection does not occur by local crack. Thus, also the armored DSS cable according to embodiment 2 can obtain the same effects as the armored DSS cable according to embodiment 1. In embodiment 2, the case of using, as the armored FO module, the armored FO module 10a has been described. However, as in embodiment 1, the same effects are obtained even in a case of using the armored FO module 10 instead of the armored FO module 10a.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, it suffices that each layer includes a plurality of ropes, and the specific number thereof may be determined as appropriate. Thus, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 optical fiber (FO)
2, 3, 4, 5 rope
10, 10a armored FO module (optical fiber module)
11 resin 20 FIMT temperature module
21 temperature sensor
30 cement block
40, 50 armored DSS cable

The invention claimed is:

1. An armored DSS cable comprising:
an inner layer part including a first rope helically wound; and
a surface layer part including an optical fiber module and a plurality of third ropes, the optical fiber module having an optical fiber and a plurality of second ropes helically surrounding the optical fiber and having a smaller outer diameter than the first rope, the third ropes having a larger outer diameter than the first rope, such that the optical fiber module and the third ropes are arranged on an identical circle and helically wound, wherein
the inner layer part and the surface layer part are formed concentrically.

2. The armored DSS cable according to claim 1, wherein the number of the second ropes is five and the number of the optical fiber modules is two.

3. The armored DSS cable according to claim 1, wherein an outer diameter of the optical fiber module is not less than 1.2 mm.

4. The armored DSS cable according to claim 1, wherein a gap between the optical fiber and the plurality of second ropes is filled with resin.

5. The armored DSS cable according to claim 1, wherein the ropes included in the surface layer part are all stainless steel wires.

6. The armored DSS cable according to claim 1, further comprising, between the surface layer part and the inner layer part, an intermediate layer part including a FIMT temperature module which is a temperature sensor and a plurality of fourth ropes having a helical shape, such that the FIMT temperature module and the fourth ropes are arranged on an identical circle and helically formed.

7. The armored DSS cable according to claim 1, wherein a plurality of stainless steel wires are included as the ropes in the inner layer part.

8. The armored DSS cable according to claim 6, wherein a plurality of stainless steel wires are included as the ropes in the intermediate layer part.

9. The armored DSS cable according to claim 2, wherein an outer diameter of the optical fiber module is not less than 1.2 mm.

10. The armored DSS cable according to claim 2, wherein a gap between the optical fiber and the plurality of second ropes is filled with resin.

11. The armored DSS cable according to claim 3, wherein a gap between the optical fiber and the plurality of second ropes is filled with resin.

12. The armored DSS cable according to claim 9, wherein a gap between the optical fiber and the plurality of second ropes is filled with resin.

13. The armored DSS cable according to claim 2, wherein the ropes included in the surface layer part are all stainless steel wires.

14. The armored DSS cable according to claim 3, wherein the ropes included in the surface layer part are all stainless steel wires.

15. The armored DSS cable according to claim 4, wherein the ropes included in the surface layer part are all stainless steel wires.

16. The armored DSS cable according to claim 9, wherein the ropes included in the surface layer part are all stainless steel wires.

17. The armored DSS cable according to claim 10, wherein
the ropes included in the surface layer part are all stainless steel wires.

18. The armored DSS cable according to claim 11, wherein
the ropes included in the surface layer part are all stainless steel wires.

19. The armored DSS cable according to claim 12, wherein
the ropes included in the surface layer part are all stainless steel wires.

20. The armored DSS cable according to claim 2,
further comprising, between the surface layer part and the inner layer part, an intermediate layer part including a FIMT temperature module which is a temperature sensor and a plurality of fourth ropes having a helical shape, such that the FIMT temperature module and the fourth ropes are arranged on an identical circle and helically formed.

* * * * *